March 19, 1963

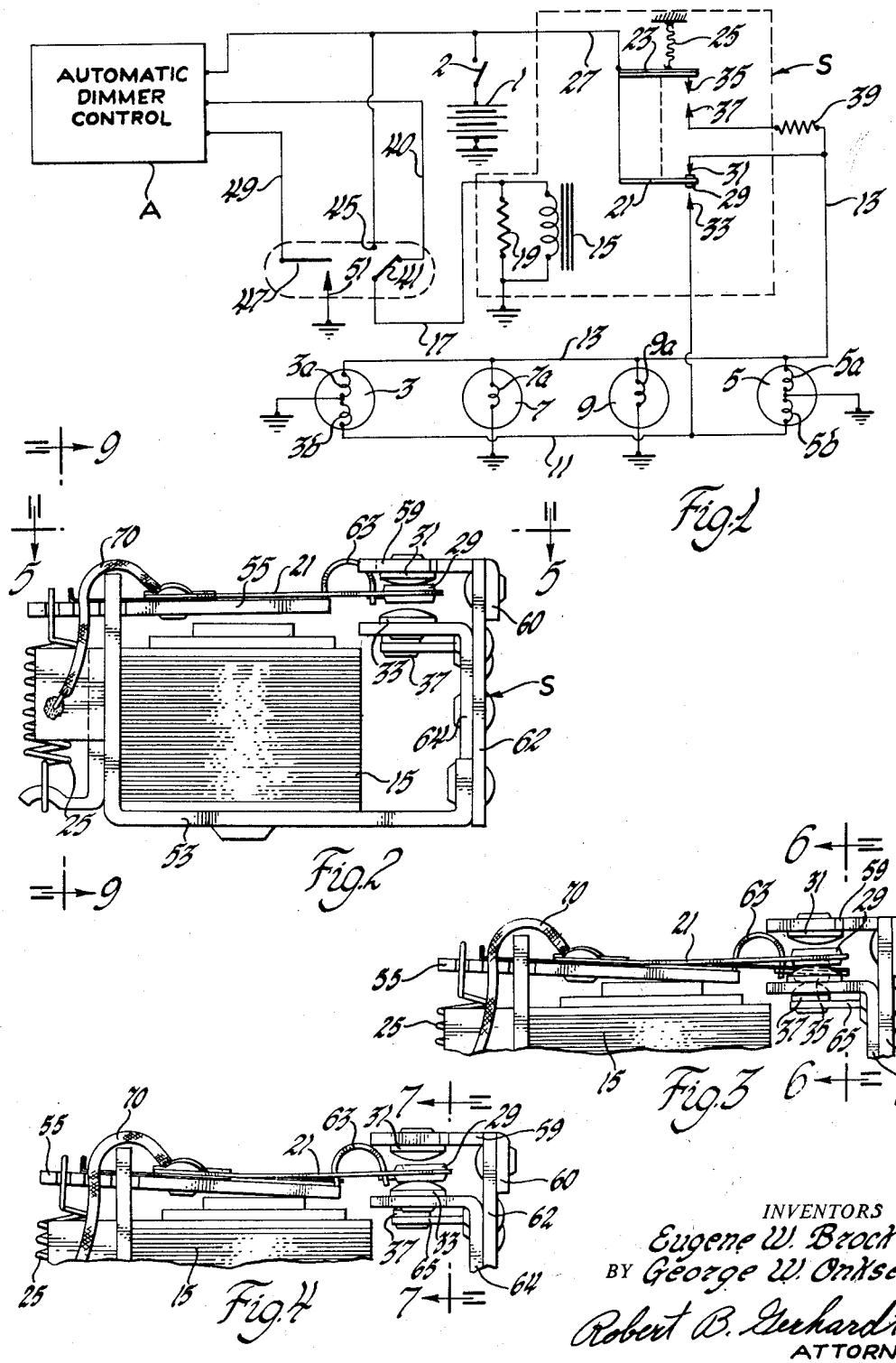

E. W. BROCK ETAL 3,082,304

SWITCH MECHANISM

Original Filed Sept. 25, 1959

INVENTORS
Eugene W. Brock &
BY George W. Onksen

Robert B. Gerhardt
ATTORNEY

United States Patent Office 3,082,304
Patented Mar. 19, 1963

1

3,082,304
SWITCH MECHANISM
Eugene W. Brock and George W. Onksen, Anderson, Ind., assignors to General Motors Corporation, Detroit, Mich., a corporation of Delaware
Original application Sept. 25, 1959, Ser. No. 842,265. Divided and this application Nov. 15, 1960, Ser. No. 69,382
4 Claims. (Cl. 200—88)

This application is a division of S.N. 842,265, Vehicle Light Control, filed September 25, 1959.

This invention relates to vehicle light switching means and more particularly to switching control means adapted to be connected to a light controlled multi-filament lamp circuit to provide an intermediate light intensity condition when switching from bright beam to dim beam operation of vehicle headlights. The present invention further relates to switching means that will provide a distinctive beam changing operation.

The conventional multi-beam headlamps used on highway vehicles provide either a high intensity high beam or a relatively low intensity dim beam. When changing from the high beam to the low beam, the sudden change in light intensity occurs almost instantaneously and the eyes of the driver and drivers of oncoming vehicles require a considerable length of time to adjust to this change. The present invention provides an intermediate condition when changing from high beam to low beam wherein when the low beams are initially energized as when meeting an approaching vehicle, the upper beams will remain on for a short period of time at a reduced intensity. This intermediate condition need only exist for only a relatively short period of time, for example one-half to several seconds to accomplish the desired result. The two step dimming outlined above is also advantageous to advise the approaching driver when a vehicle is equipped with automatic light control means for switching between high and low beam positions.

It is, therefore, an object of the invention to provide switching means that will cause the vehicle headlights to be in an intermediate light condition for a brief period when switching from high to low beams.

It is a further object to provide a lighting system wherein when switching from upper to lower beams the upper beams are maintained on at a reduced intensity for a short period of time before being turned off completely.

It is still a further object to provide a switching means utilizing a bimetallic current carrying switch element that will automatically open after a predetermined time after the switch is closed.

Still another object is to provide a switching mechanism that can easily be adapted to present lighting installations.

Other objects and advantages will become apparent from the following specification, claims and illustrations which describe and illustrate a representative form of the invention and in which:

FIG. 1 is a circuit diagram of the control system embodying our invention;

FIG. 2 is a elevational view of a special switch mechanism utilized in the invention, the switch elements shown in high beam condition;

FIG. 3 is a partial view similar to FIG. 2 showing the switch elements immediately after they have been moved to low beam condition;

FIG. 4 is another partial view similar to FIG. 2 showing the switch elements in their final low beam condition;

2

Figure 5:
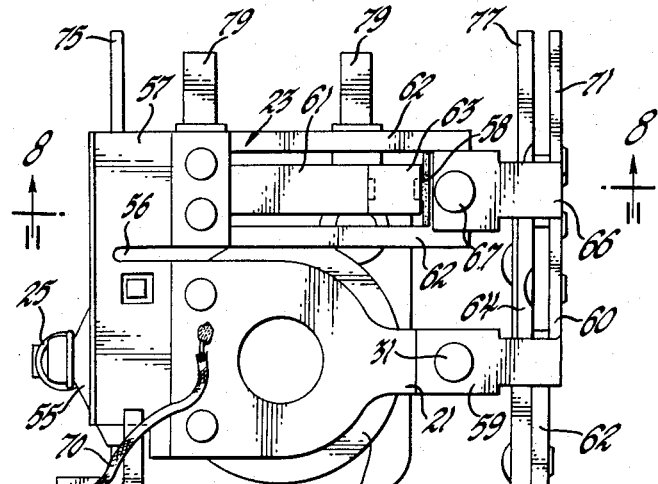
FIG. 5 is a sectional view taken on line 5—5 of FIG. 2.
Figure 6:
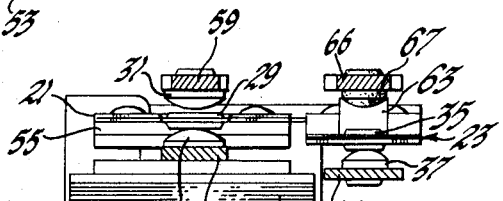
FIG. 6 is a partial sectional view taken on the line 6—6.
Figure 7:
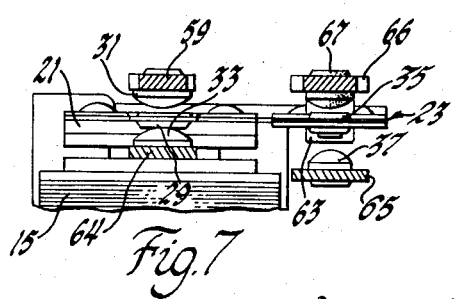
Figure 8:
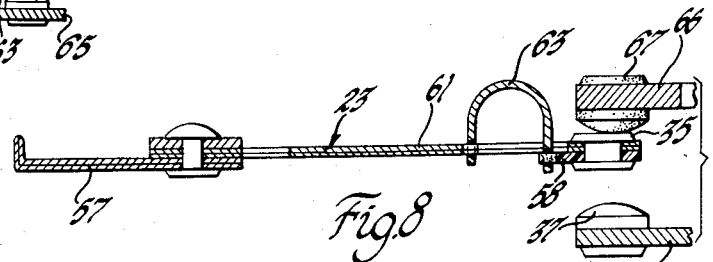

FIG. 7 is a partial sectional view taken on the line 7—7 of FIG. 4;

FIG. 8 is an enlarged sectional view taken on the line 8—8 of FIG. 5, and

Figure 9:
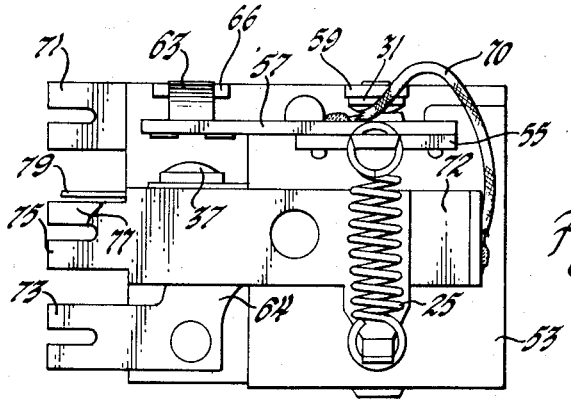

FIG. 9 is an end view of the switch mechanism taken on the line 9—9 of FIG. 2.

Referring now to the control diagram of FIG. 1, it will be seen that a battery 1 which may be the vehicle battery, provides a source of voltage through a manual light switch 2 to the vehicle lighting system. In the illustrated embodiment a four headlamp lighting system is shown with outer lights 3 and 5 having multi-filaments 3a—3b and 5a—5b respectively, while the inner headlamps 7 and 9 each have a single filament 7a and 9a. During low beam operation, only the low beam filaments 3b and 5b connected to low beam lead 11 are energized. During high or bright beam operation the upper beam filaments 3a and 5a of the outer lamps 3 and 5, as well as the bright filaments in the inner lamps 7 and 9 are energized. These filaments are all connected to bright beam lead 13. The invention can also be applied to two headlight systems without modification.

A special light control switch generally indicated S, and enclosed in the dashed line box in FIG. 1, acts to control the filaments in the lamps 3, 5, 7, and 9. The switch S includes a relay coil 15 connected at one end to a control lead 17 and at the other end to the electrical ground. A resistor 19 connected across the relay coil 15 dissipates current induced in the coil when the coil is de-energized. The relay coil when energized, causes movement of a pair of movable switch elements 21 and 23 normally held in the upper position, as viewed in FIGURE 1, by a spring 25. The movable switch elements 21 and 23 are commonly connected to the battery lead 27. Switch element 21 carries a contact 29 which in the normal upper position of element 21 engages a cooperating contact 31 to connect battery voltage from lead 27 to the high beam filament lead 13. When moved by the coil 15 to its lower position, the contact 29 on element 21 engages a contact 33 to connect battery voltage from line 27 to the low lead 11.

The second switch element 23 operated simultaneously with element 21, carries a contact 35 which does not engage any cooperating electrical contact when the element is in its upper position as shown in FIG. 1. When the element 23 is moved down by the coil 15 being energized, the contact 35 engages a contact 37 to connect battery 1 to the bright beam lead 13 through a fixed resistor 39. Under this condition the voltage on the upper beam filaments will be lower than normal so that the intensity of the light produced by these filaments will be lower than normal. By selecting the proper resistance value any degree of intensity can be obtained.

The switch element 23 is of bimetallic construction and has a small but predetermined internal resistance. When current passes through the element 23 from the battery 1 contacts 35—37 resistor 39, and lead 13 to the bright beam lead 13, the power dissipated through the resistance produces a torque in the direction of the low expanding side of the bimetal. This action will be explained more fully below in the more detailed description of the switch mechanism shown in FIGS. 2 to 9. The bending torque on element 23 will cause the same to bend and the contact 35 will then disengage from contact 37 leaving only the low beam filaments 3b and 5b energized through lead 11, contacts 33—29, switch element 21, and battery lead 27.

While the present invention could be utilized in a manually controlled vehicle lighting system, we have shown the same in an automatic system employing a photo-electric automatic dimmer control. The automatic dimmer control, generally designated by the box A, may be of any suitable form but which is preferably of the type which will cause a voltage to be applied to to the output lead 40 whenever the automatic dimmer control reacts to the lights of an approaching vehicle and calls for switching the vehicle lights from upper beam to lower beam. An example of the type of automatic dimmer control that could be utilized is shown in U.S. Patent 2,890,386, entitled Automatic Headlamp Control System. Obviously other automatic systems could be utilized. A two position manual-automatic switch 41 shown in the automatic position in FIG. 1, connects the automatic dimmer output lead 40 to the switch relay coil 19 through the lead 17. When the switch 41 is moved to its other position or manual low beam position, the relay 15 is connected by means of the switch 41 and contact 45 directly to the battery voltage lead 27. This acts to cut out operation of the automatic dimmer control and through the switching mechanism S, acts to establish and maintain a low beam condition.

A second manually operated override switch 47 connects a control lead 49 extending from the automatic dimmer control A to a ground lead 51. With lead 51 grounded the automatic dimmer control A will always be conditioned for bright beam operation regardless of the amount of light received by the photo-electric pickup, not shown, of the automatic dimmer control.

Referring now to FIGS. 2 through 9 which show the details of the switch mechanism S, it will be seen that a relay coil 15 corresponding to coil 15 of FIG. 1 is mounted on a switch frame 53. Pivoted on the frame and positioned immediately above the coil 15, is a lever type armature 55 which is biased away from the coil by a spring 25. Riveted to the armature 55 is a leaf spring switch element 21 corresponding to the switch element 21 shown in the circuit diagram FIG. 1.

The spring element 21 has a contact 29 on its free end which normally engages a contact 31, as shown in FIG. 2. Contact 31 is carried on a flange 59 formed on a plate member 60, in turn fastened to the switch frame 53 by an insulating and mounting plate 62. The member 60 has an extending prong 71 for connection to the upper beam light lead.

Located below and in the path of contact 29 is another contact 33 attached to a flange formed on a plate member 64. The plate 64 is supported by the insulating plate 62 and has a connecter prong 73 extending therefrom. The plate 64 and its prong 73 are adapted to be connected to the lower beam lighting lead 11 of FIGURE 1.

Also attached to the armature 55 is a bimetallic member 57 having a slot 56 formed near the center thereof. Riveted to the bimetallic element 57 is a second switch element 23 which is fabricated to have an inner extending tab portion 61 and outer portions 62 which are joined together on their ends remote from the attachment point element 57. The remote end carries a movable contact 35 corresponding to the contact 35 in FIG. 1. An over-center C spring 63 has slots on each end that engage the inner portion 61 and an insulated tongue 58 attached to the outer portion of the spring 23. The spring 63 normally holds the element 23 in the shape shown in FIG. 8. The switch element 23 is also of bimetallic construction and has a predetermined internal resistance so that current flowing through the same will cause a torque on the spring member 23 to bend end of the same upward as viewed in FIG. 8 against the force of the spring 63. When the torque due to the bimetallic uneven expansion of the member 23 is sufficient to overcome the force of the overcenter spring 63, the outer end of the element 23 will snap into the position shown in FIG. 4.

Located directly below the contact 35 carried by the element 23 is a contact 37 which is carried by a flanged plate member 65 which extends out and has a connecting prong 77 formed thereon. Formed immediately above contact 35 is a reset button 67 carried on a flange portion 66 of the member 60. This reset button acts to snap the spring switch member 23 into its original shape of FIG. 8 upon release armature 55 by the coil 15.

A flexible wire 70 connects the element 57 and thus the two switch members 21 and 23 to a plate 72 having a pronged end 75. The prongs 71, 73, 75, 77, and 79 are adapted to fit into corresponding sockets (not shown) in a mounting board suitably located in the vehicle. These sockets connect to the various battery, automatic dimmer and headlight wires. Prong 71 connects to the upper beam lead 13 of FIG. 1, prong 73 to the lower beam lead 11, prong 75 to the battery voltage wire 27 and prong 77 to the voltage reducing resistor 39. One of the prongs 79 connects to the automatic dimmer lead 17 and the other to the vehicle electrical ground.

It should be pointed out that the resistor 39 serves a double purpose. Besides providing a voltage drop to lower the intensity of the upper beam filaments, it is of the ceramic fuse resistor type which will blow or burn out in the event of bimetal switch failure in the on or down position. Thus, the system has a fail safe feature in that upon burnout of the fuse resistor, the light switch relay will perform as a conventional high-low beam control switch.

The bimetal element 57 acts to compensate the bimetal switch 23 for operation over a large ambient temperature range. This element 57 acts to regulate the contact pressure of the bimetal snap switch 23 to correct for the ambient temperature effects on the switch itself. Element 57 has a low internal resistance and hence is not affected by current flow through itself. By changing the design of the bimetal switch element 23, the period that the bright filaments remain on reduced intensity during a bright to dim change can be varied.

*Operation*

The operation of the system will now be described. With the headlamps turned on by closing switch 2, and switch 41 in its automatic position shown in FIG. 1, the automatic dimmer contact A will normally be in bright or upper beam condition and no voltage will appear at lead 40. The relay coil 15 will then be de-energized and the switch element 21 will be positioned as shown in FIGS. 1, 2, 5, 8 and 9. Battery voltage will then be applied through lead 27, switch 21, contacts 29—31 to the bright beam lead 13 and through the bright beam filaments 3a, 7a, 9a and 5a to the electrical ground. The upper section of the switch S including switch member 23 is then in its normal upper position and makes no electrical connection.

When the automatic dimmer control A responds to the lights of an oncoming vehicle, battery voltage is applied to lead 40 and through the switch 41 to the relay coil 15. Coil 15 is also energized, its switch 41 is moved to its manual low beam position. With coil 15 energized, the armature and switch elements 21 and 23 are pulled down to the position shown in FIGS. 3 and 6. Contact 29 then engages contact 33 to apply battery voltage from line 27 to the dim or low beam line 11. At the same time contacts 29—31 are opened disconnecting the original circuit to the upper beam lead 13. Simultaneously a circuit is completed from the battery 1 through switch member 23, contacts 35—37, and through the fuse resistor 39 to the upper beam line 13. This causes a reduced current to flow through the upper beam filaments, causing the light intensity of said lamps to be reduced to approximately one-half brilliance. The combination of lower beam plus reduced upper beam provides a noticeable overall reduction in light brilliance or glare from the normal bright beam condition.

Current passing through the bimetal switch member 23 heats the same causing it to snap away from contact 37 when sufficient torque is obtained to overcome the action of the overcenter spring 63. This can be made to occur after any period of time, however, a period of approximately one second has been found to be satisfactory. After the bimetallic switch 23 has snapped the parts are as shown in FIGS. 4 and 7.

When the automatic dimmer A removes the voltage from lead 40, the armature and switch elements 21 and 23 are released, contacts 29—33 disengage and contacts 29—31 engage to restore the lower beam condition. At the same time the reset button 67 snaps the switch 23 back over center to its original position ready for the next operation.

The invention can be installed in present vehicles without disturbing the wiring harness and can be utilized in both manual and automatic lighting systems. The use of the invention will provide a greater degree of safety during night driving. Changes and modifications will be apparent to those skilled in the art as will other applications of the invention. These changes and applications are within the scope of the invention which is limited only by the following claims.

We claim:

1. Switch mechanism for vehicle lighting control including a relay coil, armature means adjacent to said relay coil and arranged to be operated by energization of said coil, a pair of switch elements connected to and operated by said armature, an electrical contact carried by each of said elements, cooperating contacts for said element carried contacts and positioned to be engaged by said element carried contacts when said armature is moved by said coil, one of said elements having a bimetallic portion, said bimetallic portion being responsive to heat so as to bend and change the element shape to cause the contact carried by said one element to disengage from its cooperating contact, a snap action spring connected to and biasing said one element into a first shape whereby bending action caused by heating of said bimetallic portion is opposed by said snap action spring until said bending action reaches a predetermined force, said snap action spring holding the contact carried by said one element in disengaged position after cooling of said bimetallic portion, and means for causing said bimetallic portion to heat after said one spring contact has been moved by said armature into engagement with its associated contact.

2. The switch mechanism of claim 1 wherein said last mentioned means comprises said bimetallic portion having a predetermined internal electrical resistance that forms a current carrying path to the contact carried by said one spring, whereby a predetermined current flowing through said one spring contact and its cooperating contact will cause said bimetallic portion to heat and bend a predetermined amount to disengage said contacts.

3. Switch mechanism for vehicle lighting control including a relay coil, armature means adjacent to said relay coil and arranged to be operated by energization of said coil, a pair of leaf spring switch elements connected to and operated by said armature, an electrical contact carried by each of said spring elements, cooperating contacts for said spring carried contacts and positioned to be engaged by said spring carried contacts when said armature is moved by said coil, one of said spring elements having a heat responsive bimetallic portion operable to bend and change the element shape when the bimetallic portion is heated to cause the contact carried by said one spring element to disengage the contact carried by said one spring element from its cooperating contact, a snap action spring connected to and normally biasing said one spring element into a first shape whereby bending action caused by heating of said bimetallic portion is opposed by said snap action spring until said bending action reaches a predetermined force, said snap action spring holding said contact carried by said one spring element in disengaged position after cooling of said bimetallic portion, means for causing said bimetallic portion to heat after said one spring contact has been moved by said armature into engagement with its associated contact, and reset means for restoring said one spring element to said first shape upon release of said armature by said relay coil.

4. The switch mechanism of claim 3 wherein a second bimetal member is operatively connected to said one spring element to compensate for changes in ambient temperature.

References Cited in the file of this patent

UNITED STATES PATENTS

| | | |
|---|---|---|
| 1,922,452 | Parks | Aug. 15, 1933 |
| 2,311,048 | Harrold | Feb. 16, 1943 |
| 2,482,955 | Wilson | Sept. 27, 1949 |
| 2,626,373 | Echlin | Jan. 20, 1953 |
| 2,816,195 | Holmes | Dec. 10, 1957 |
| 2,913,549 | Howell | Nov. 17, 1959 |